(12) United States Patent
Yeh

(10) Patent No.: US 6,421,158 B1
(45) Date of Patent: Jul. 16, 2002

(54) OPTICAL SCANNING MODULE WITH ROTATABLE REFLECTION MIRROR FOR IMAGE SCANNING DEVICE

(75) Inventor: Chien-Liang Yeh, Ping Tung Hsian (TW)

(73) Assignee: UMAX Data Systems, Inc., Hsinchu (TW)

( * ) Notice: Subject to any disclaimer, the term of this patent is extended or adjusted under 35 U.S.C. 154(b) by 13 days.

(21) Appl. No.: 09/748,001

(22) Filed: Dec. 27, 2000

(51) Int. Cl.[7] .............................................. G02B 26/08
(52) U.S. Cl. ...................... 359/212; 359/196; 359/223; 359/226; 399/200; 399/202; 358/474; 358/483
(58) Field of Search ................................. 359/196, 200, 359/201, 212, 223, 225, 226; 355/51, 60, 66, 67; 399/200, 201, 202; 358/474–497

(56) References Cited

U.S. PATENT DOCUMENTS 6,081,363 A * 6/2000 Yeh ............................ 359/196

* cited by examiner

*Primary Examiner*—James Phan
(74) *Attorney, Agent, or Firm*—Rosenberg, Klein & Lee

(57) ABSTRACT

An image scanning device with a rotatable reflection mirror arranged in an optical scanning module thereof for establishing either a reflective or transparent scanning optical path is disclosed. The optical scanning module includes a first focusing lens, a second focusing lens, an image sensing module, a plurality of fixed reflective optical path mirrors, a plurality of fixed transparent optical path mirrors, and a rotatable reflection mirror. At scanning a reflective document, the rotatable reflection mirror is rotated to a first reflection position. A light beam from a first light source projects to the reflective document. The image of the reflective document is reflected by the rotatable reflection mirror and the fixed reflective optical path mirrors, and then received by the image sensing module through the first focusing lens. At scanning a transparent document, the rotatable reflection mirror is rotated to a second reflection position. A light beam from a second light source projects to the transparent document. The image of the transparent document is reflected by the rotatable reflection mirror and the fixed transparent optical path mirrors, and then received by the image sensing module through the second focusing lens.

6 Claims, 8 Drawing Sheets

OPTICAL SCANNING MODULE WITH ROTATABLE REFLECTION MIRROR FOR IMAGE SCANNING DEVICE

BACKGROUND OF THE INVENTION

1. Field of the Invention

The present invention relates to an image scanning device with dual scanning modes, and more particularly to an image scanning device including a rotatable reflection mirror arranged in an optical scanning module of the image scanning device for selectively scanning a reflective original document or a transparent original document.

2. Description of the Prior Art

Typical image scanners are commonly categorized into reflective and transparent types. Reflective type scanner is employed for scanning of reflective document, while transparent type scanner is employed for scanning of transparent document.

Referring to FIGS. 1 and 2, a typical reflective type scanner is shown. The scanner 1 generally includes a top frame 11 with a document positioning plate 12 which is a plane surface made of for example glass or other light transmittable, substantially rigid material, for supporting a reflective original document 10 to be scanned, defining a document scanning window. A cover 13 is pivotally attached to the top frame 11 of the scanner 1 for covering the document positioning plate 12 during the scanning process.

The reflective type scanner 1 generally includes an optical scanning module 14 and a pair of guiding rails 15a, 15b. The optical scanning module 14 is provided with a light source 16, a plurality of light reflection mirrors 171, 172, 173, 174, a focusing lens 18, and an image sensing module 19 such as a Charge Coupling Device (CCD) or a Contact Image Scanning (CIS). The optical scanning module 14 may be moved by a driving device (not shown) along the guiding rails 15a, 15b in a direction I. When the optical scanning module 14 completes a scanning process, the image of the reflective original document 10 is scanned.

As shown in FIGS. 3 and 4, a typical transparent type scanner 2 is shown. The scanner 2 also includes a top frame 21 and a document positioning plate 22. A back lighting module 23 is pivotally attached to the top frame 21 of the scanner 2. The back lighting module 23 is provided with a back light source 26 therein.

The transparent type scanner 2 includes an optical scanning module, 24 moveably supported by a pair of guiding rails 25a, 25b. The optical scanning module 24 includes a plurality of reflection mirrors 271, 272, 273, a focusing lens 28, and an image sensing module 29. The optical scanning module 24 may be moved by a driving device (not shown) along the guiding rails 25a, 25b in the direction I. When the optical scanning module 24 completes a scanning process and with the light provided by the back light source 26, the image of the transparent original document 20 supported on the document positioning plate 22 is scanned.

The conventional reflective or transparent scanner described above can only conduct a specific scanning mode, i.e. the reflective type scanner can not conduct a transparent scanning process, while the transparent type scanner can not conduct a reflective scanning process. In prior art, there is provided with a mode-selective scanner which is capable of selectively conducting reflective or transparent scanning processes. However, the scanner is too complicated to economically manufacture. In addition, it is too complicate to assemble.

Thus, it is desirable to provide an image scanning device with a switching mechanism which is capable of overcoming the problems described above and facilitating scanning operation.

SUMMARY OF THE INVENTION

Consequently, a primary object of the present invention is to provide an image scanning device with a rotatable reflection mirror mounted in the optical scanning module. By means of the rotatable reflection mirror, the scanner is capable of conducting either a reflective scanning mode or a transparent scanning mode.

In order to achieve the object set forth, a scanner for selectively scanning reflective and transparent original document in accordance with the present invention comprises an optical scanning module provided with a rotatable reflection mirror for selectively scanning a reflective original document or a transparent original document. The rotatable reflection mirror may be rotated by a driving device comprising such as a stepping motor and a mechanical shaft coupled to the rotatable reflection mirror. At scanning a reflective document, the rotatable reflection mirror is rotated to a first reflection position. A light beam from a first light source projects to the reflective document. The image of the reflective document is reflected by the rotatable reflection mirror and a number of fixed reflective optical path mirrors, and then received by an image sensing module through a first focusing lens. At scanning a transparent document, the rotatable reflection mirror is rotated to a second reflection position. A light beam from a second light source projects to the transparent document. The image of the transparent document is reflected by the rotatable reflection mirror and a number of fixed transparent optical path mirrors, and then received by the image sensing module through a second focusing lens.

Preferably, two position detecting unites are arranged within an effective rotation radius of the rotatable reflection mirror for detecting the position of the rotatable reflection mirror.

To further understand the present invention, reference is made to the following detailed description of a preferred embodiment of the present invention, as well as the attached drawings, wherein:

BRIEF DESCRIPTION OF THE PREFERRED EMBODIMENT

Figure 5:
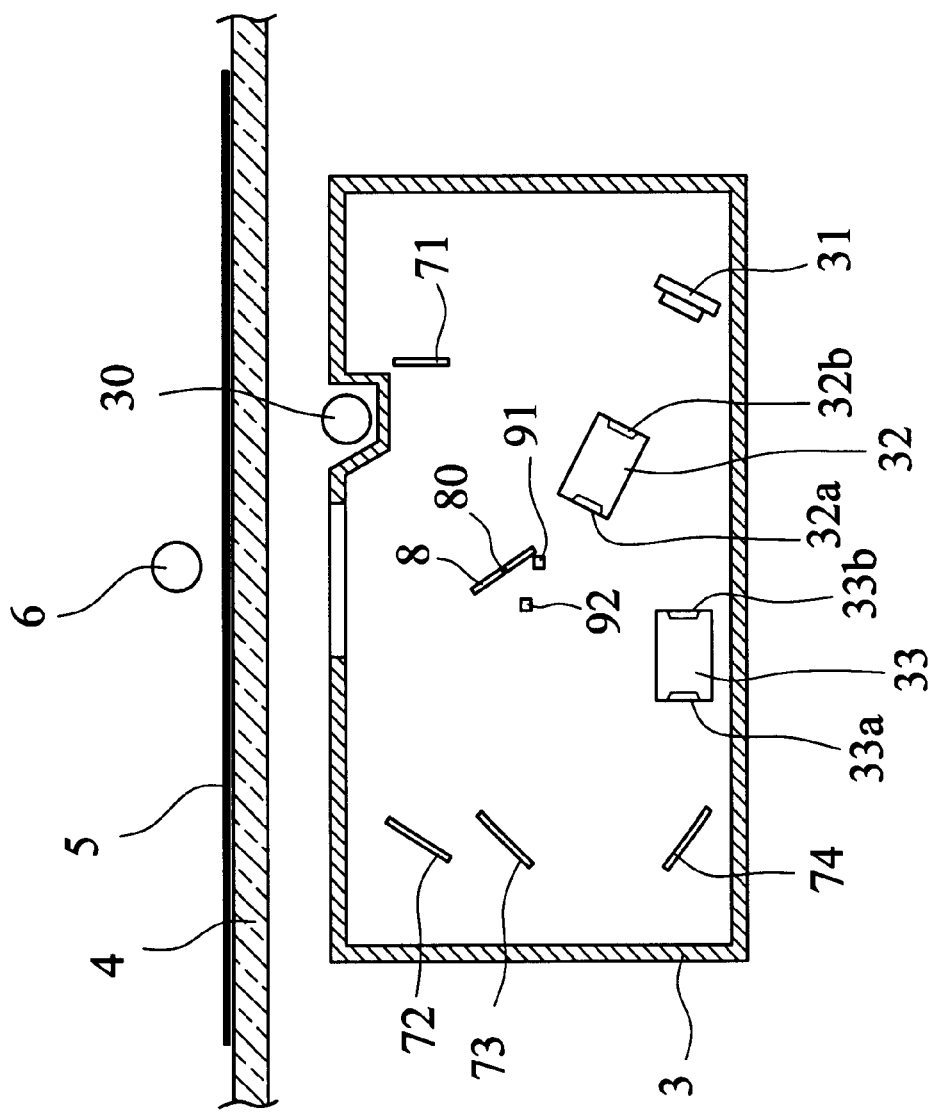
FIG. 5 is a schematic view showing a rotatable reflection mirror, a number of reflection mirrors, two focusing lenses, and an image sensing module are arranged in optical scanning module of a scanner in accordance with a preferred embodiment of the present invention.

Referring to FIG. 5, an optical scanning module 3 is arranged in a housing of a scanner in accordance with the present invention and which is moveable along a pair of guiding rails arranged in the housing. A document positioning plate 4 is mounted on the housing of the scanner and arranged above the optical scanning module 3 for supporting an original document 7 thereon.

Figure 1:
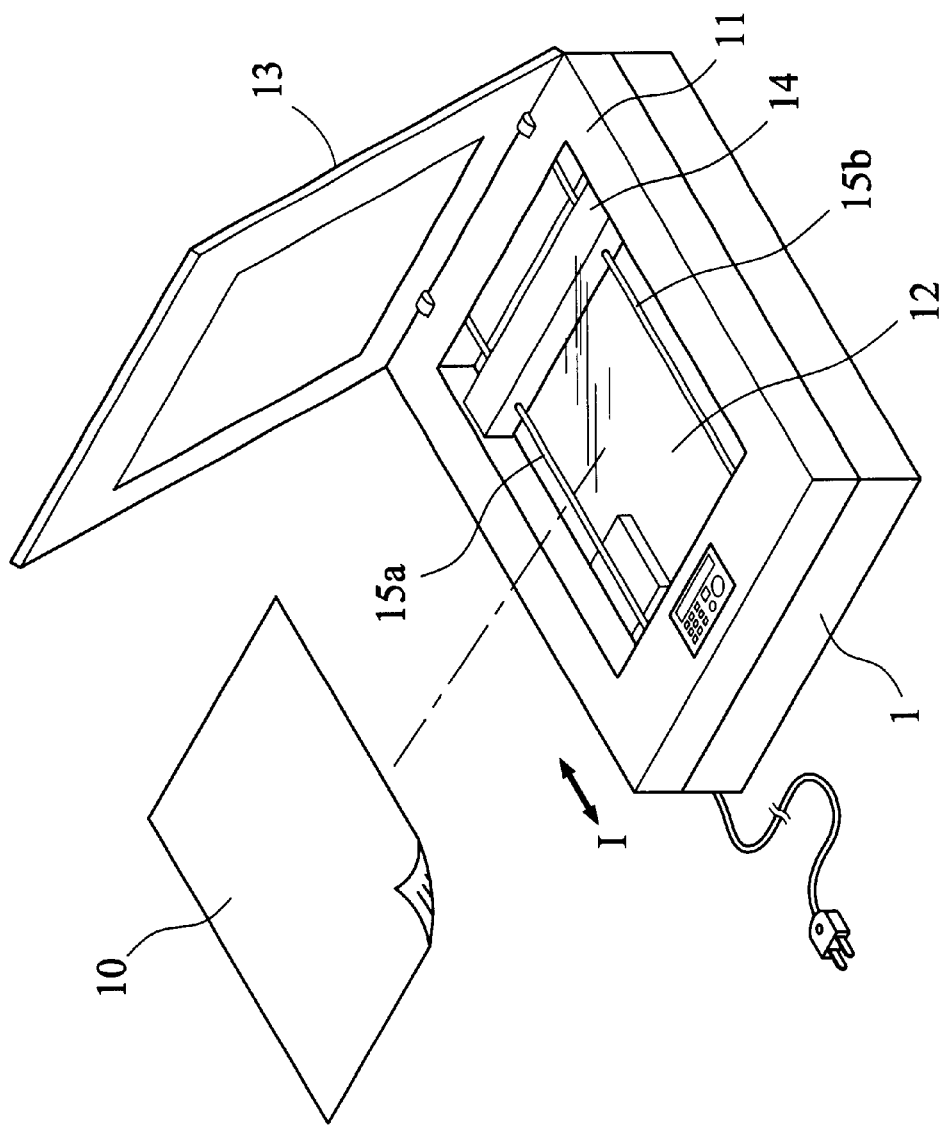
FIG. 1 is a perspective view of a prior art reflective type scanner.
Figure 2:
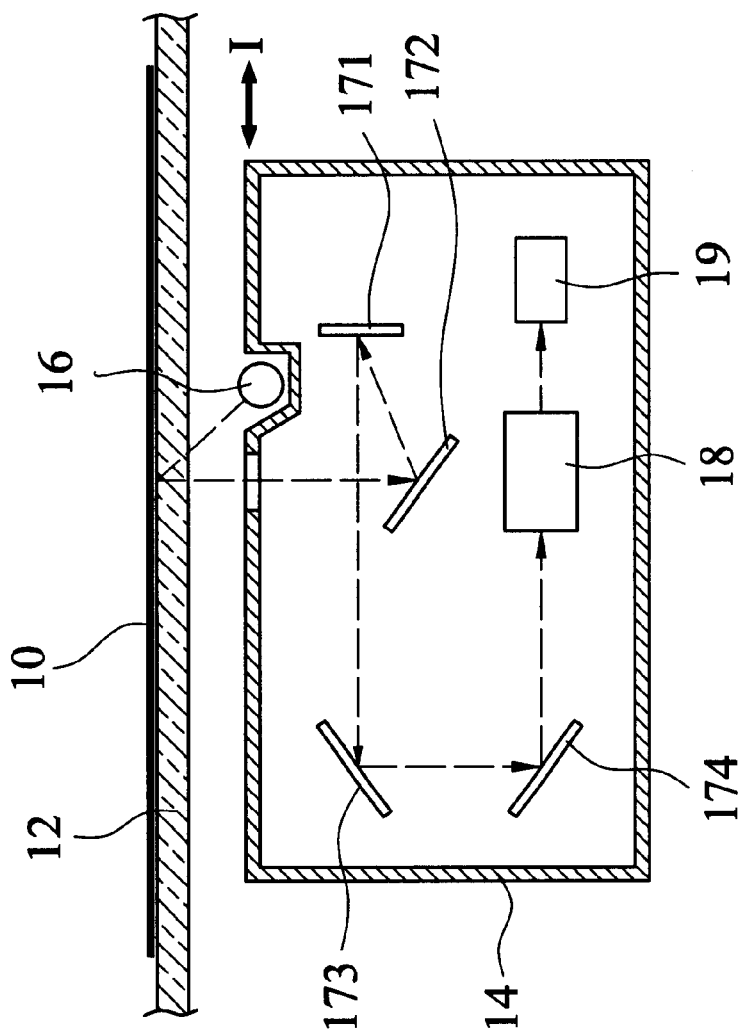
FIG. 2 a schematic view showing an optical path in an optical scanning module of the reflective type scanner of FIG. 1.
Figure 3:
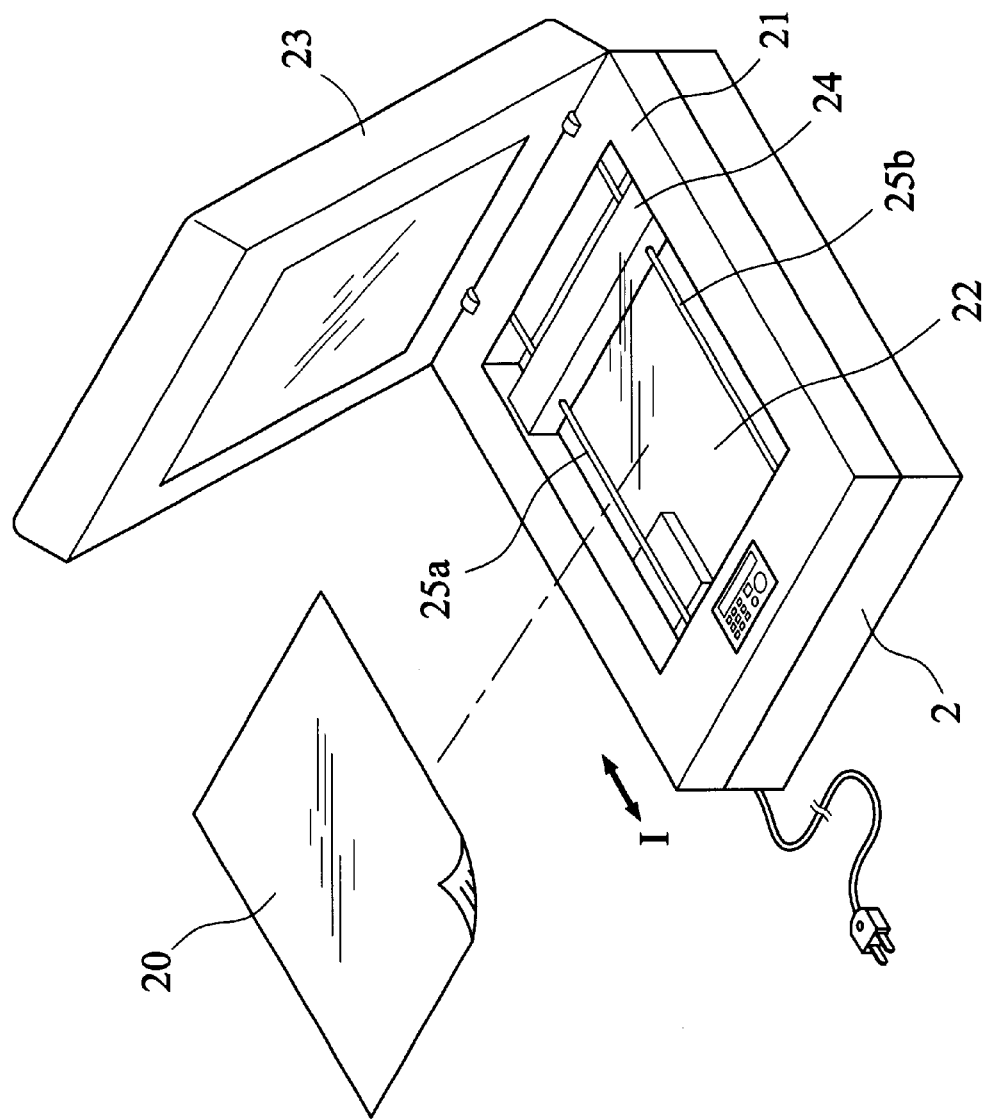
FIG. 3 a perspective view of a prior art transparent type scanner.
Figure 4:
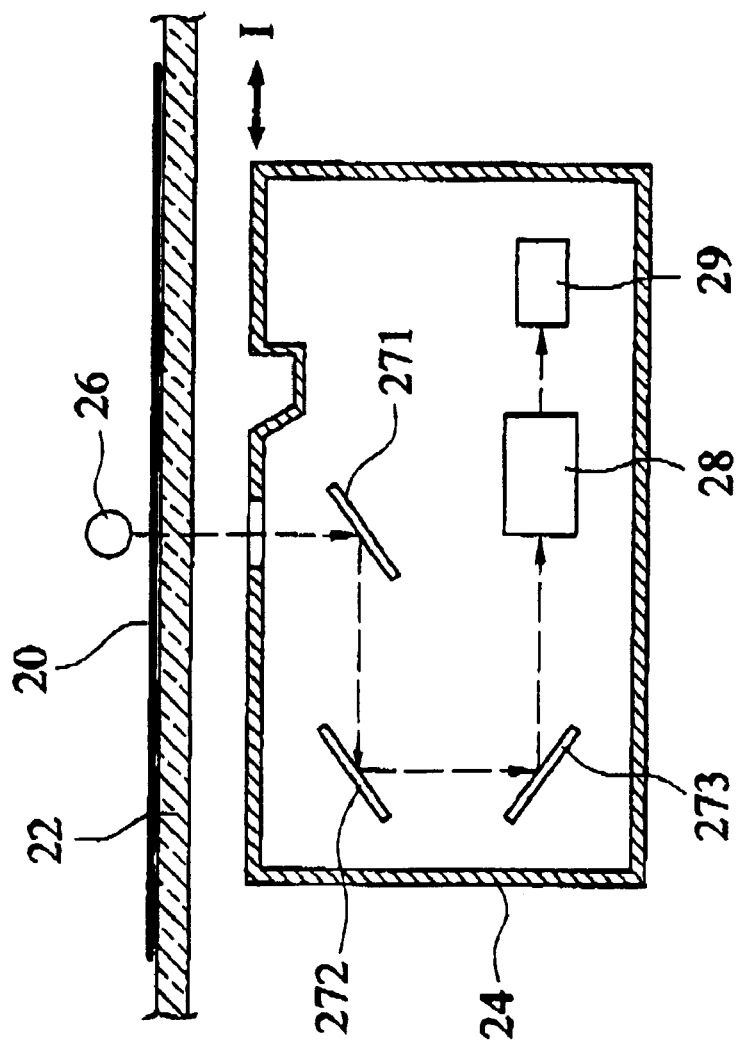
FIG. 4 is a schematic view showing an optical path in an optical scanning module of transparent type scanner of FIG. 3.

The optical scanning module 3 is provided with a first light source 30 for providing light source during a reflective scanning process. Besides, a second light source 5 is arranged above the document positioning plate 4 for providing back light source during a transparent scanning process. In general, the second light source 5 is arranged in a conventional back lighting module 23 as shown in FIG. 3.

The optical scanning device 3 of the present invention includes an image sensing module 31, a first focusing lens 32, a second focusing lens 33, a plurality of fixed light reflection mirrors 71, 72, 73, 74, and a rotatable reflection mirror 8. The image sensing module 31 includes a charge coupled device (CCD). The first focusing lens 32 has a light receiving inlet 32a facing to the fixed light reflection mirror 72 and a light projecting outlet 32b facing to the image sensing module 31. The second focusing lens 33 has a light receiving inlet 33a facing to the fixed light reflection mirror 74 and a light projecting outlet 33b facing to the image sensing module 31. In addition, the first focusing lens 32 is particularly arranged at an angle with respect to the second focusing lens 33.

Figure 6:
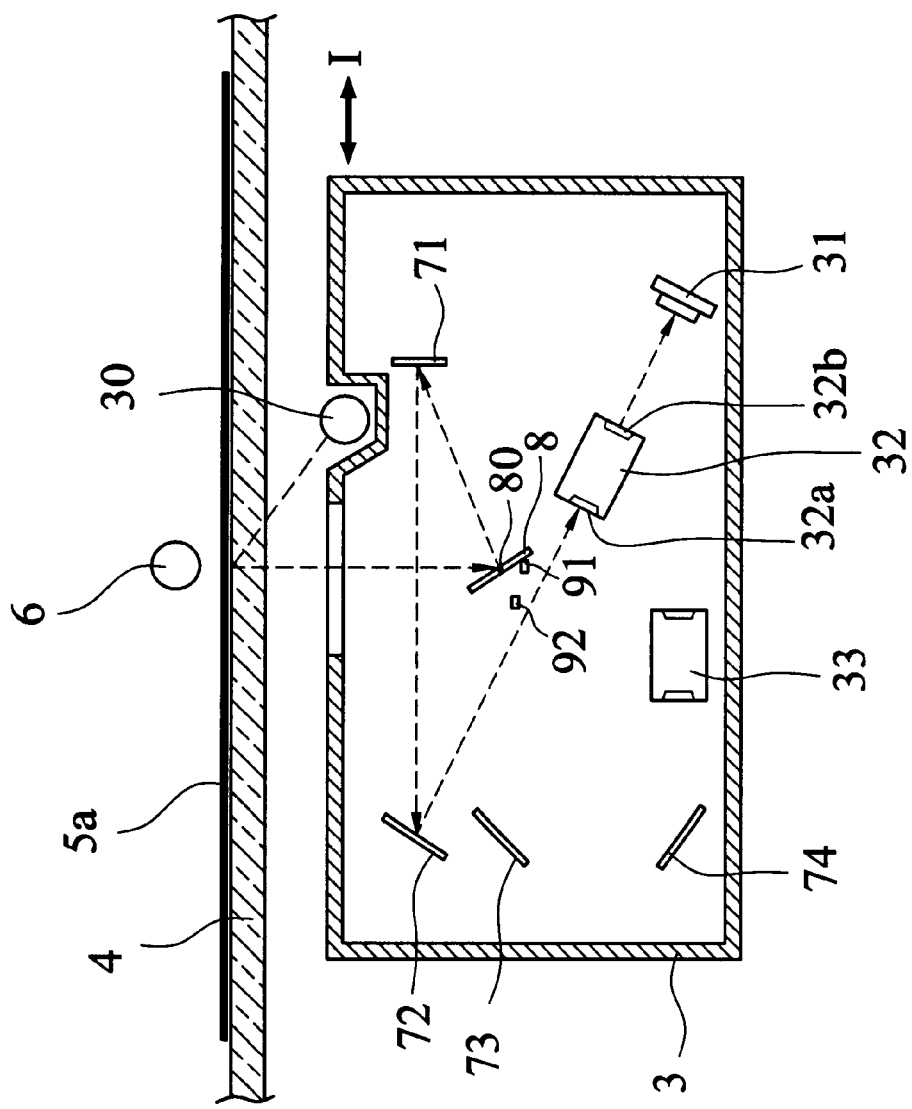
FIG. 6 is a schematic view showing a reflective optical path during scanning a reflective original document in accordance with the present invention, in which the rotatable reflection mirror is at a first reflection position.
Figure 7:
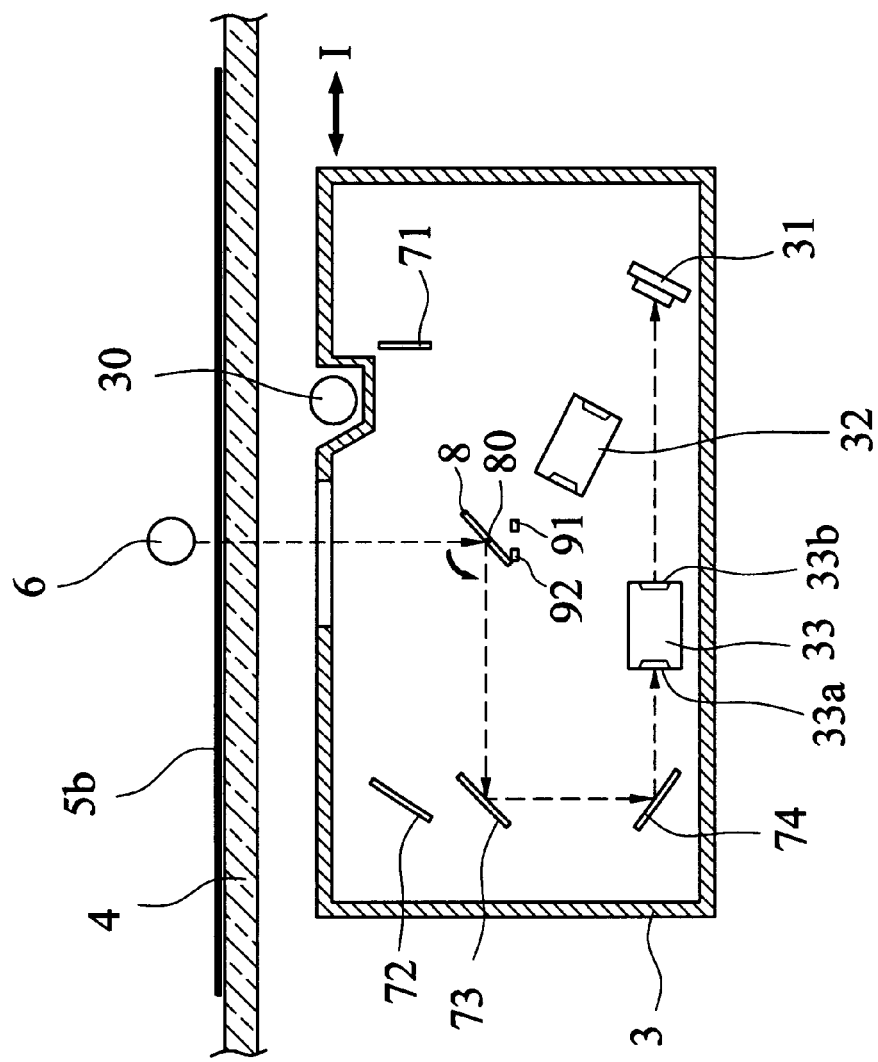
FIG. 7 is a schematic view showing a transparent optical path during scanning a transparent original document in accordance with the present invention, in which the rotatable reflection mirror is at a second reflection position.

The rotatable reflection mirror 8 may be rotated about a mechanical shaft 80 by a known driving mechanism to a first reflection position as shown in FIG. 6 or a second reflection position as shown in FIG. 7. The position of the rotatable reflection mirror 8 can be detected by a first and second position detecting unites 91, 92 properly arranged adjacent to the rotatable reflection mirror 8.

The present invention includes a reflective image optical path and a transparent image optical path. The reflective image optical path is configured by the fixed light reflection mirrors 71, 72 and the first focusing lens 32. When a reflective original document 5a is to be scanned, the rotatable reflection mirror 8 is rotated to the first reflection position, as shown in FIG. 6. A light beam as indicated by dashed line from the first light source 30 projects to the reflective original document 5a supported on the document positioning plate 4 of the scanner frame. The image of the reflective original document 5a is reflected by the rotatable reflection mirror 8, and the reflection mirrors 71, 72 sequentially. Then, the reflected image of the reflective original document 5a is received by the image sensing module 31 through the first focusing lens 32.

The transparent image optical path of the present invention is configured by the fixed light reflection mirrors 73, 74 and the second focusing lens 33. When a transparent original document 5b is to be scanned, the rotatable reflection mirror 8 is rotated to the second reflection position, as shown in FIG. 7. A back light beam as indicated by dashed line from the second light source 6 projects to the transparent original document 5b supported on the document positioning plate 4 of the scanner frame. The image of the transparent original document 5b is reflected by the rotatable reflection mirror 8, and the reflection mirrors 73, 74 sequentially. Then, the reflected image of the transparent original document 5b is received by the image sensing module 31 through the second focusing lens 33.

Figure 8:
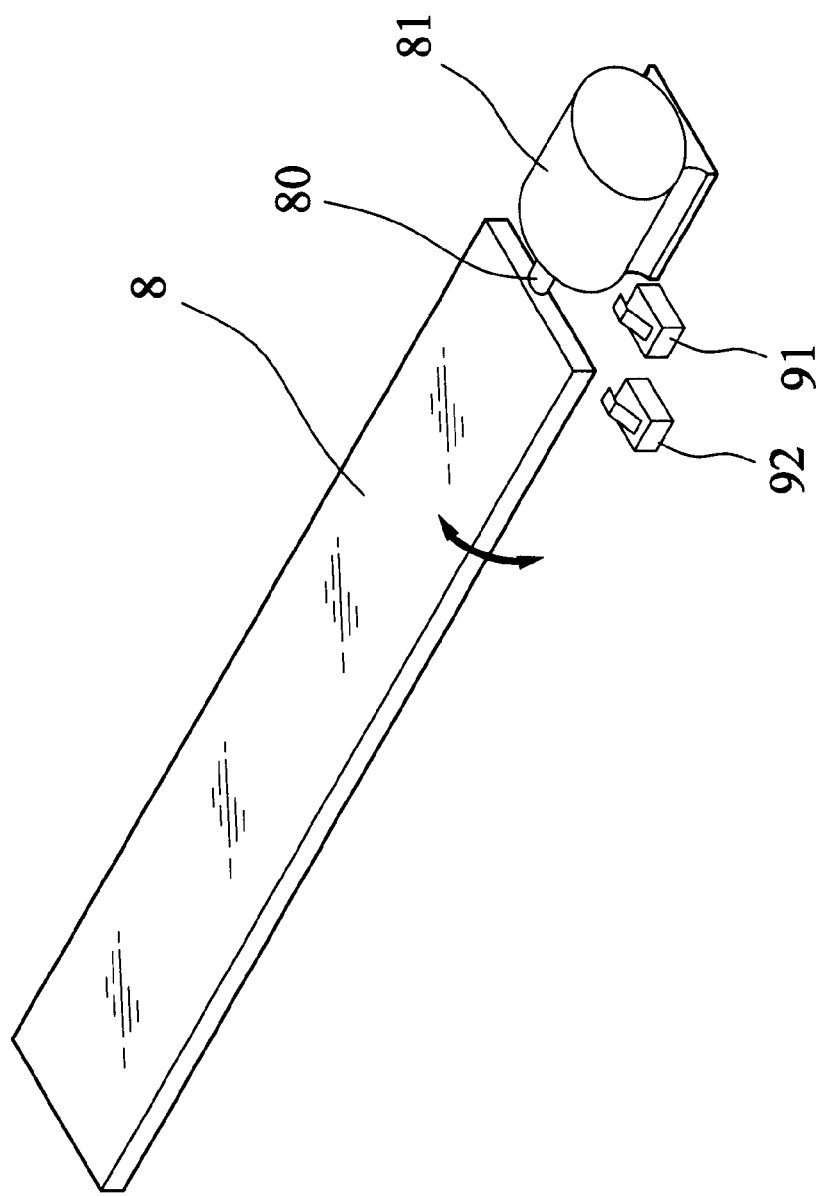
FIG. 8 is a perspective view showing the rotatable reflection mirror is coupled to a driving device in accordance with a preferred embodiment of the present invention.

FIG. 8 is a perspective view showing the rotatable reflection mirror 8 is coupled to a driving device 81 in accordance with a preferred embodiment of the present invention. The driving device 81 may be a conventional stepping motor, DC motor, or AC motor. The driving device 81 is provided with a mechanical shaft 80 which is mechanically coupled to the rotatable reflection mirror 8, with reference to FIG. 5. So, the driving device 81 is capable of rotating the rotatable reflection mirror 8 via the mechanical shaft 80 to either the first reflection position as shown in FIG. 6 or the second reflection position as shown in FIG. 7. The position of the rotatable reflection mirror 8 can be detected by the first and second position detecting unites 91, 92 properly arranged adjacent to the rotatable reflection mirror 8.

In practical use, the above mentioned first focusing lens 32 and the second focusing lens 33 can be of different optical magnifications so as to achieve different optical scanning resolutions according to requirement at operation of reflective and transparent scanning.

Although the preferred embodiments of the present invention have been described to illustrate the present invention, it is apparent that changes and modifications in the specifically described embodiments can be carried out without departing from the scope of the invention which is intended to be limited only by the appended claims.

What is claimed is:

1. An image scanning device with an optical scanning module for scanning an image of a reflective document by incorporating with a first light source or a transparent document by incorporating with a second light source, comprising:

a first focusing lens having a light receiving inlet and a light projecting outlet;

a second focusing lens having a light receiving inlet and a light projecting outlet, the second focusing lens being arranged at an angle with respect to the first focusing lens;

an image sensing module arranged facing to the light projecting outlets of the first focusing lens and the second focusing lens;

a reflective optical path comprising a plurality of light reflection mirrors arranged in the optical scanning module;

a transparent optical path comprising a plurality of light reflection mirrors arranged in the optical scanning module; and a rotatable reflection mirror arranged in the reflective optical path and the transparent optical path, rotatable by a driving device to a first reflection position or a second reflection position;

when scanning the reflective document, the rotatable reflection mirror is rotated to the first reflection position in order to reflect a light beam projected from the first light source to the image sensing module through the reflective optical path and the first focusing lens; when scanning the transparent document, the rotatable reflection mirror is rotated to the second reflection position in order to reflect a light beam projected from the second light source to the image sensing module through the transparent optical path and the second focusing lens.

2. The image scanning device as recited in claim 1, wherein the driving device comprises a mechanical shaft mechanically coupled to the rotatable reflection mirror and a motor for rotating the rotatable reflection mirror to the first or second reflection position via the mechanical shaft.

3. The image scanning device as recited in claim 2, wherein the motor is a stepping motor.

4. The image scanning device as recited in claim 1, wherein the image sensing module comprises a Charge Coupled Device.

5. The image scanning device as recited in claim 1, wherein the rotatable reflection mirror is arranged beneath the second light source to receive and reflect the light beam projected from the second light source when scanning the transparent document, and to receive and reflect the light beam projected from the first light source and reflected by the reflective document when scanning the reflective document.

6. The image scanning device as recited in claim 1, the first focusing lens and the second focusing lens having different optical magnifications so as to achieve different optical scanning resolutions at scanning the reflective and transparent documents.

* * * * *